Figure 5:
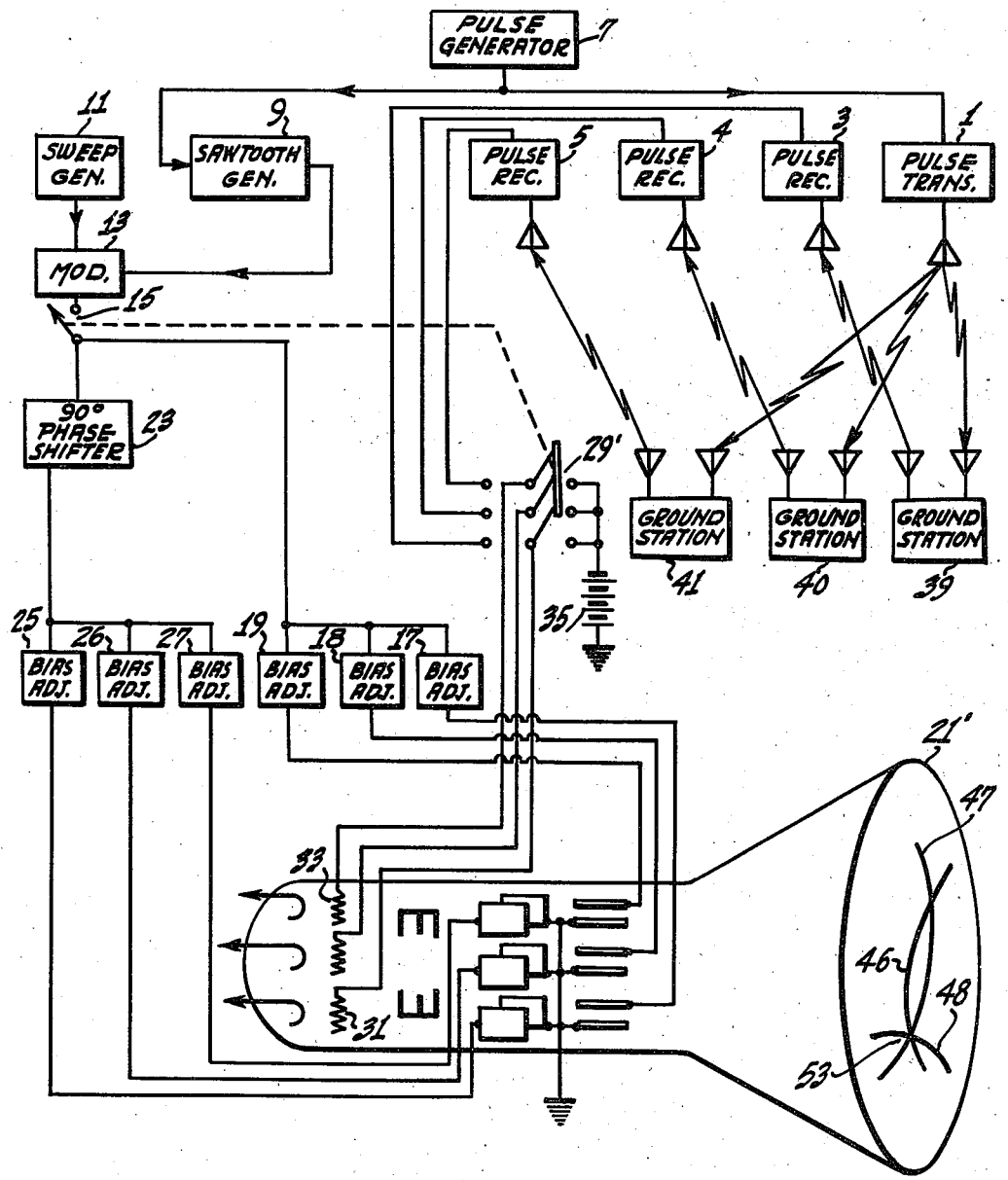

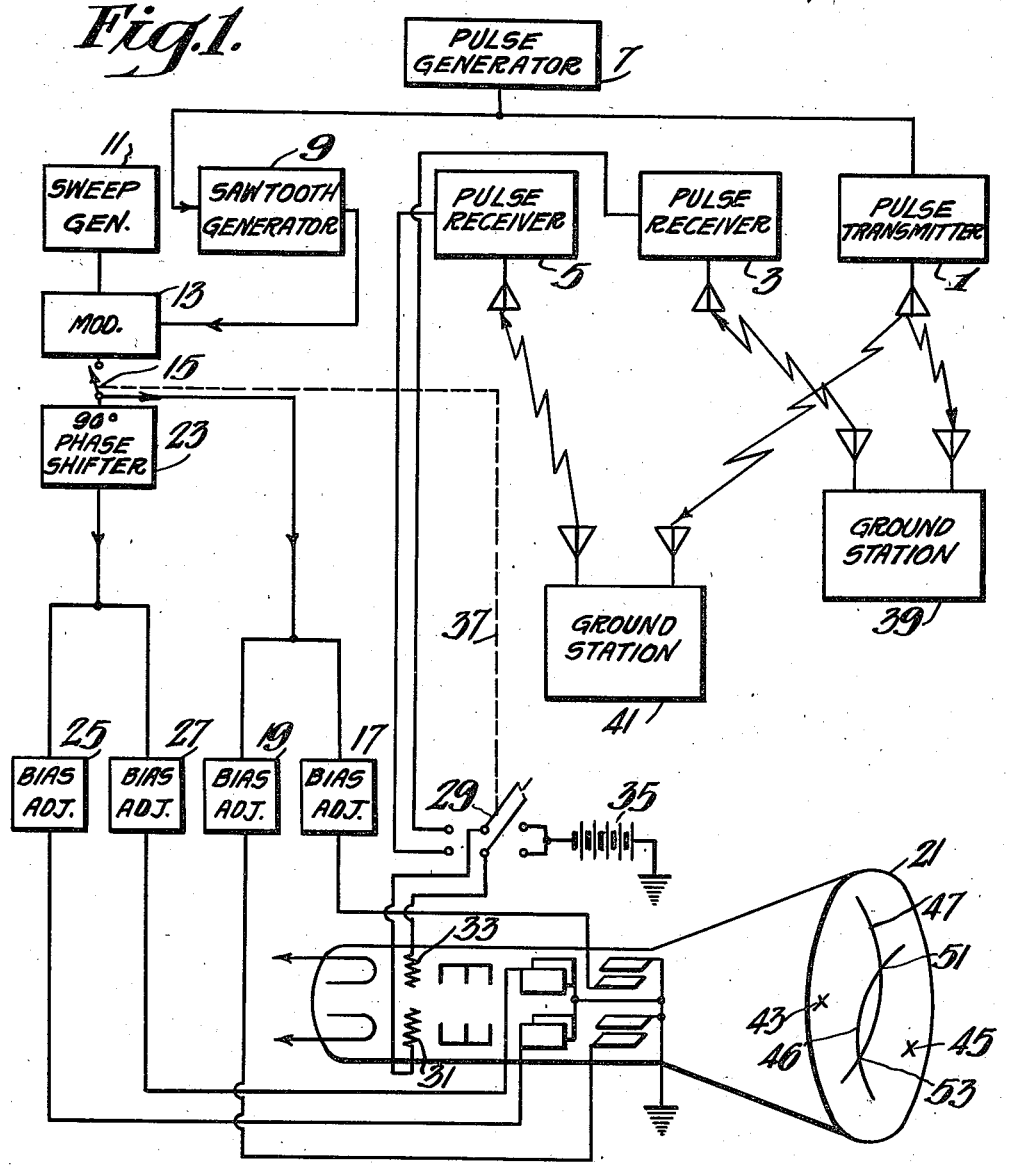

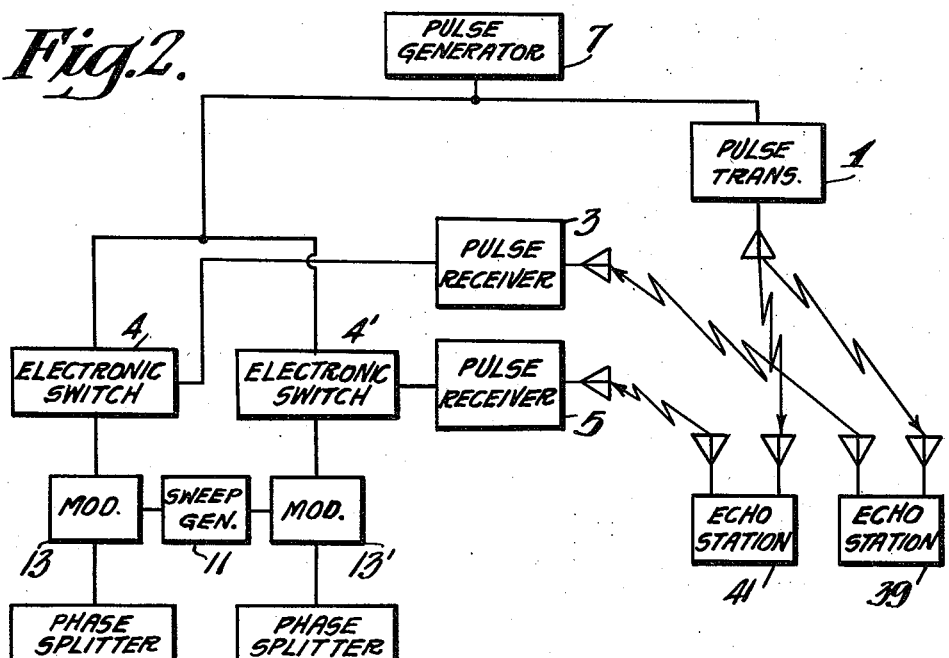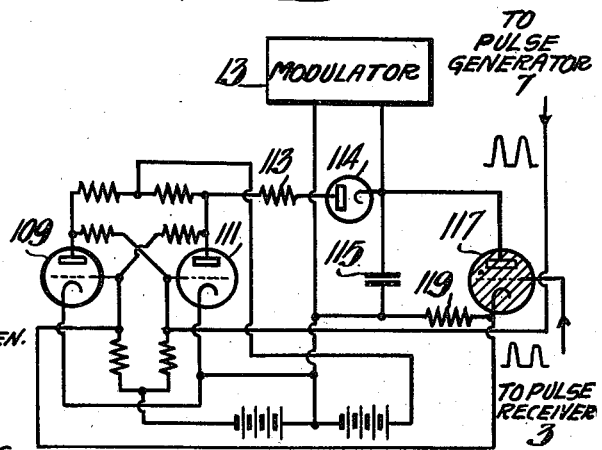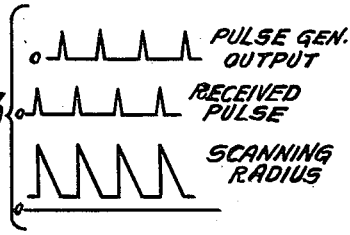

INVENTOR.
DAVID G. C. LUCK
BY
ATTORNEY

Patented Sept. 9, 1947

2,427,220

UNITED STATES PATENT OFFICE 2,427,220

RADIO POSITION INDICATING SYSTEM

David G. C. Luck, Hightstown, N. J., assignor to Radio Corporation of America, a corporation of Delaware Application November 14, 1942, Serial No. 465,525

7 Claims. (Cl. 250—1.62)

1

The invention relates to radio position finding, and more particularly to systems for indicating the position of a mobile craft with respect to a plurality of fixed stations, using relayed transmissions between the fixed stations and the mobile station. The distance from the mobile station to each of the fixed stations is determined by the time required for a signal to travel from the mobile station to the fixed station, and back to the mobile station. The position of the mobile station may be determined on a map by plotting circles centered at the positions of the fixed stations with radii corresponding to the respective distances.

It is the principal object of the present invention to provide an improved indicator means for such systems. Another object is to provide an improved method of and means for automatically plotting the position of a mobile station upon a map or chart placed over the screen of a cathode ray tube. These and other objects will become apparent to those skilled in the art upon consideration of the following description, with reference to the accompanying drawing of which Fig. 1 is a schematic block diagram of one embodiment of the invention, Fig. 2 is a modification of Fig. 1, Fig. 3 is a group of graphical representations of voltages in the operation of the system of Fig. 2, Fig. 4 is a circuit diagram of the electronic switch indicated in Fig. 2, and Figure 5 is a further modification of Figure 1.

Referring to Fig. 1, the system comprises a mobile station including a pulse transmitter 1, and pulse receivers 3 and 5. A pulse generator 7 is connected to the transmitter 1 and to a sawtooth voltage generator 9. A sweep voltage generator 11 is connected to a modulator 13 which is arranged to be controlled by the output of the sawtooth generator 9. The output circuit of the modulator 13 is connected through a switch 15 and adjustable bias control circuits 17 and 19 to the vertical deflection circuits of a double gun cathode ray tube 21. The switch 15 is also connected through a 90° phase shifter 23 and adjustable bias control circuits 25 and 27 to the horizontal deflection circuits of the tube 21. The pulse receiver 3 is connected through a switch 29 to an intensity control electrode 31 of the tube 21. The pulse receiver 5 is similarly connected to the other intensity control electrode 33. The switch 29 is arranged to disconnect the electrodes 31 and 33 from the receivers 3 and 5, and connect them to a direct current source 35. The switches 15 and 29 are mechanically ganged, as indicated by the dash line 37.

2

Ground stations 39 and 41 are provided at fixed reference locations. Each ground station comprises a receiver tuned to respond to signals from the pulse transmitter, and a transmitter, operating at a frequency different from that of the transmitter 1 connected to the output of the receiver. The pulse receiver 3 is tuned to respond to signals from the transmitter of the ground station 39 and the pulse receiver 5 is tuned to respond to signals from the transmitter of the ground station 41, which operates at a frequency different from those of the pulse transmitter 1 and the transmitter of the ground station 39.

The adjustment and operation of this system is as follows:

The switch 15 is opened and the switch 29 is operated to connect the source 35 to the control electrodes 33 and 31. The bias control circuits 17, 19, 25 and 27 are manually adjusted to set the undeflected spots of the cathode ray guns at points 43 and 45 on the screen, corresponding to the map positions of the ground stations 39 and 41 respectively. The switch 15 is then closed and the switch 29 moved to connect the receivers 3 and 5 to the electrodes 31 and 33. The output voltage of the sweep generator 11 passes through the modulator 13 and is split into two phases by means of the phase shifter 23, producing circular scanning of the two cathode ray beams about the centers 43 and 45. The amplitudes of the scanning voltages and hence the radius of the arcuate scanning patterns is controlled by the modulator 13. The sawtooth generator 9 is synchronized with the pulse generator 7 and controls the modulator 13 providing cyclical sawtooth variations of the amplitude of the deflection voltages applied to the tube 21. With each pulse from the generator 7, the radius of the scanning pattern starts at zero and increases uniformly throughout the pulse period. The electrodes 31 and 33 are normally biased to cut off the cathode ray beams, so that no visible traces are produced on the screen.

Each pulse from the generator 7 is transmitted to the ground stations 39 and 41 which respond by retransmitting a similar pulse to the receivers 3 and 5 respectively. The receiver output circuits are so poled as to oppose the bias on the electrodes 31 and 33. Thus the radial scanning cycle is initiated simultaneously with each transmitted pulse; each received pulse momentarily overcomes the beam cutoff bias at the instant of reception of the return pulse, producing an illuminated trace at a radius corresponding to the distance of the respective ground station from the mobile station. The pulse generator provides a train of pulses cyclically repeating at such a rate that traces present the appearance of steady illumination. The trace 47, centered about the point 43, is applied to the screen by the momentary biasing effect of the return signal from the ground station 39. The trace 46 is similarly applied to the screen by the effect of the signal from the ground station 41. These traces intersect at two points, 51 and 53, one of which corresponds to the map position of the mobile station, and the other of which is ambiguous. Usually the operator will have enough additional information, such as his approximate position, or the bearing of one of the ground stations, to enable him to select the correct one of the two intersections. However, if an unambiguous indication is required, a third ground station 40 and a third mobile receiver 4 may be used, with an additional control channel 18, 26 and a three gun cathode ray tube, 21' as illustrated by Fig. 5. A third trace 48 will be produced, intersecting traces 46 and 47 at the point 53.

Fig. 2 shows a modification of Fig. 1. In this arrangement the circular scanning pattern is swept inwardly from the maximum radius to that corresponding to the distance. This radius is maintained for the remainder of the pulse repetition period, producing a luminous trace as a result of the repeated scanning at that radius. Referring to Fig. 3, the received pulse initiates the radial scanning cycle and the next transmitted pulse stops the radial scanning; the radius is maintained constant until the following return pulse is received. No intensity control of the beam is required, since the inward motion of the scanning pattern is too rapid to produce a visible trace. This arrangement has the advantage of producing a more brilliant indication than the system of Fig. 1. A further advantage lies in the fact that the trace is of approximately uniform intensity, independent of the radius. This is because the scanning is maintained for a longer portion of the pulse period at the greater radii, thus compensating the higher spot velocity.

This system includes a sweep voltage generator 11, pulse generator 7, pulse transmitter 1, ground stations 39 and 41, and pulse receivers 3 and 5, similar to the correspondingly designated elements of Fig. 1. A pair of electronic switches 4 and 4' are connected to the sweep voltage generator 11, pulse generator 7 and to the receivers 3 and 5 respectively. The circuits 4 and 4' are connected to modulators 13 and 13'. The sweep generator 11 is connected through the modulators to phase splitters, 24 and 24', and thence through centering controls 26 and 26' to the deflection elements 20 and 20' respectively of the tube 21. The phase splitters and centering controls are similar to the corresponding elements illustrated in Fig. 1.

Referring to Fig. 4, the electronic switch 4 includes a pair of vacuum tubes 109 and 111 connected as direct current amplifiers, with the input of each connected to the output of the other. The plate circuit of the tube 111 is connected through a resistor 113 and a diode rectifier 114 to a capacitor 115. The time constant of this R-C circuit is made relatively long with respect to the pulse repetition period of the generator 7. A gaseous discharge tube 117 is connected across the capacitor 115, which is also connected to the control input circuit of the modulator 13. The control grid of the tube 117 is connected to the pulse receiver 3 and the control grid of the tube 109 is connected to the cathode of the tube 117. A resistor 119 is included in the cathode circuit of the tube 117.

The operation of this system is as follows:

Each pulse produced by the generator 7 is transmitted to the echo or ground station, then relayed to the receiver 3. When the return pulse appears at the receiver 3, the tube 117 is fired, short circuiting the capacitor 115. This reduces the bias on the modulator 13 to its minimum value, producing the maximum amplitude of sweep voltage output. The discharge current of the capacitor 115 produces a voltage drop across the resistor 119, overcoming the cutoff bias on the grid of the tube 109, and cutting off the tube 111. The voltage of the plate of the tube 111 goes positive, initiating constant-current charging of the capacitor 115. This continues for the remainder of the pulse repetition period, decreasing the output of the modulator 13 until the next pulse is generated by the generator 7. This pulse overcomes the cutoff bias on the tube 111 and cuts off the tube 109. The voltage at the plate of the tube 111 goes to its minimum value, and charging of the capacitor 115 stops. Since the tube 117 is non-conductive at this time and the rectifier 114 prevents discharge through the resistor 113, the voltage on the capacitor 115 remains substantially constant until the next received pulse fires the tube 117. During this interval the sweep voltage output of the modulator 13 remains constant at an amplitude corresponding to the phase difference between the transmitted pulse and the received pulse. The above cycle of operation is repeated with each pulse from receiver 3, producing a succession of superimposed traces at such a rate as to present the appearance of constant illumination.

The second channel of the system comprises the electronic switch 4' which is a duplicate of the electronic switch 4, modulator 13", phase splitter 24' and centering control 26", and operates in the same manner as the above described channel. The resulting traces present the same appearance and are interpreted in the same manner as those produced by the system of Fig. 1.

Thus the invention has been described as an improved position indicator system for travel time distance measuring systems. Circular traces are produced on the face of a cathode ray tube, centered at positions corresponding to the known locations of ground stations, and automatically controlled so that their radii correspond to the distances of the respective ground stations from a mobile station. One point of intersection of the circular traces then corresponds to the position of the mobile station.

I claim as my invention:

1. A radio position indicating system including means arranged to provide a reference pulse train and plurality of synchronous trains of pulses, each delayed with respect to said reference pulse train by an interval proportional to a respective distance to be plotted, a cathode ray tube, means for providing a plurality of circular scanning patterns on said tube, adjustable bias means arranged to center each of said scanning patterns about a predetermined point, means for cyclically varying the radius of said scanning patterns in response to said reference train and means for cyclically varying the intensity of illumination of each of said patterns in response to a respective one of said delayed pulse trains.

2. The method of plotting the position of a mobile station with respect to the position of a plurality of fixed stations, on the face of a cathode ray tube, comprising the steps of producing a train of reference pulses, deriving a plurality of synchronous trains of pulses delayed with respect to said reference train by intervals proportional to the respective distances of said fixed stations from said mobile station, producing a plurality of substantially circular cathode ray scanning patterns centered about points corresponding to the respective positions of said fixed stations, cyclically varying the radii of said scanning patterns in response to said reference train, and cyclically varying the intensity of illumination of said scanning patterns in response to respective ones of said delayed trains.

3. The method of plotting on the screen of a cathode ray tube a position in terms of its distances from a plurality of pre-determined reference points, comprising the steps of producing a reference wave train, deriving a plurality of synchronous wave trains, each delayed with respect to said reference train by an amount proportional to one of said distances, producing a plurality of substantially circular cathode ray scanning patterns centered at positions corresponding resepctively to the positions of said reference points, cylically varying the radii of said scanning patterns in response to said reference waves, and cyclically varying the intensity of each of said scanning patterns in response to a respective one of said delayed waves.

4. A radio position indicating system including a mobile station, an impulse generator at said mobile station, means for transmitting signals from said mobile station in response to the output of said impulse generator, a plurality of fixed stations comprising means responsive to signals from said mobile station to transmit signals to said mobile station, cathode ray indicator means at said mobile station, deflection voltage generator means arranged to provide substantially circular scanning patterns on said cathode ray means, adjustable bias means for centering each of said circular patterns about a predetermined point, modulator means arranged to vary said deflection voltages cyclically in response to said impulse generator, and means for varying the intensity of illumination of each of said scanning patterns in response to the signal received at said mobile station from a corresponding one of said fixed stations.

5. A radio position indicating system comprising a mobile station including means for transmitting signals, fixed stations each including means responsive to said transmitted signals to transmit similar signals to said mobile station to produce at said mobile station a plurality of signals similar to signals transmitted by said mobile station but delayed with respect thereto by intervals proportional respectively to the distances of said fixed stations from said mobile station, a pulse generator arranged to control the transmissions from said mobile station, a sawtooth wave generator controlled by said pulse generator, a cathode ray tube, deflection voltage generator means arranged to produce a plurality of circular scanning patterns on the screen of said cathode ray tube, modulator means arranged to control the amplitude of said deflection voltages in response to said sawtooth wave generator, adjustable bias means arranged to control the positions of said scanning patterns, and means for controlling the intensity of illumination of each of said scanning patterns in response to a corresponding one of said delayed signals.

6. A radio position indicating system including means arranged to provide a reference pulse train and a plurality of synchronized pulse trains, each delayed with respect to said reference pulse train by an interval proportional to a respective distance to be plotted, a cathode ray tube, means for providing a plurality of circular scanning patterns on said tube, adjustable bias means arranged to center each of said scanning patterns about a predetermined point, means for cyclically varying the radius of each of said scanning patterns in response to said reference train, and means for stopping the variation in radius of each of said patterns during each cycle of said reference train for a period related in magnitude to the delay of a corresponding one of said delayed trains.

7. A radio position indicator system comprising a control station and a plurality of reference stations, said control station including a pulse generator, a pulse transmitter connected to said pulse generator and arranged to transmit signals to said reference stations, a receiver and a transmitter arranged to be modulated by the output of said receiver at each of said reference stations, a plurality of receivers at said control station each arranged to respond to the signal from one of said reference stations, a cathode ray tube including a plurality of deflection voltage input circuits, a deflection voltage generator, modulator means connected to said deflection voltage generator, phase splitting circuits connected between said modulator means and said deflection input circuits to provide a plurality of circular scanning patterns on said cathode ray tube, a sawtooth wave generator, an electronic switch means connected to said pulse receivers and to said sawtooth generator and arranged to control said modulator means whereby the radius of each of said scanning patterns is cyclically varied between an upper limit and a value proportional to the distance of a corresponding one of said reference stations from said control station.

DAVID G. C. LUCK.

REFERENCES CITED

The following references are of record in the file of this patent:

UNITED STATES PATENTS

| Number | Name | Date |
|---|---|---|
| 1,750,668 | Green | Mar. 18, 1930 |
| 2,301,929 | Budenbom | Nov. 17, 1942 |
| 2,134,716 | Gunn | Nov. 1, 1938 |
| 2,209,191 | Dearing | July 23, 1940 |
| 2,183,634 | Zworykin | Dec. 19, 1939 |

FOREIGN PATENTS

| Number | Country | Date |
|---|---|---|
| 406,903 | Great Britain | Mar. 8, 1934 |